(12) United States Patent
Arnold et al.

(10) Patent No.: US 7,607,458 B2
(45) Date of Patent: Oct. 27, 2009

(54) HOUSING WITH INTERSECTING PASSAGES

(75) Inventors: Jonathan D. Arnold, Ringwood (GB); Antonin Cheron, Bexleyheath (GB)

(73) Assignee: Delphi Technologies, Inc., Troy, MI (US)

( * ) Notice: Subject to any disclaimer, the term of this patent is extended or adjusted under 35 U.S.C. 154(b) by 145 days.

(21) Appl. No.: 11/986,446

(22) Filed: Nov. 21, 2007

(65) Prior Publication Data
US 2008/0282879 A1  Nov. 20, 2008

(30) Foreign Application Priority Data
Nov. 27, 2006 (EP) .................................. 06256052

(51) Int. Cl.
*F04B 53/16* (2006.01)
(52) U.S. Cl. ..................... 138/177; 251/366; 415/182.1
(58) Field of Classification Search ................. 251/366, 251/367; 138/177, 178; 415/182.1; 137/884
See application file for complete search history.

(56) References Cited

U.S. PATENT DOCUMENTS 5,192,026 A * 3/1993 Rix et al. ..................... 239/584
5,269,650 A * 12/1993 Benson ........................ 138/177
6,364,641 B2 * 4/2002 Mori ........................... 138/177
6,382,940 B1    5/2002 Blume

FOREIGN PATENT DOCUMENTS

EP    0717227    6/1996
GB    2285096    11/1994

* cited by examiner

*Primary Examiner*—John Bastianelli
(74) *Attorney, Agent, or Firm*—Thomas N. Twomey

(57) ABSTRACT

A housing for use in high-pressure fluid applications, comprising a first passage defining a first axis (P1) and a second passage defining a second axis (P2), wherein the first and second passages intersect at an opening defined by an intersection at one end of the second passage. When sectioned on a plane normal to the second axis (P2) and not intersecting the first passage, the intersection defines an ellipse (E) in the plane and centred on the second axis (P2), the ellipse having a major axis equal in length to the width (D2) of the intersection and a minor axis equal in length to the height (D1) of the intersection. A wall of the intersection describes a curve in the plane, the curve passing through the points where the major and minor axes of the ellipse (E) meet the perimeter of the ellipse (E), and through points which lie outside the ellipse (E) and which are offset from the ellipse (E) by an offset distance (K).

25 Claims, 11 Drawing Sheets

SECTION ON A - A

SECTION ON B - B

HOUSING WITH INTERSECTING PASSAGES

TECHNICAL FIELD

This invention relates to a part comprising intersecting drillings or passages. In particular, the invention relates to the shape of the part in the region of the intersection of the passages. The invention has applications in, but is not limited to, the field of high-pressure pumps for automotive applications.

BACKGROUND TO THE INVENTION

Many engineering components comprise metal housings containing passages. The passages are usually cylindrical and may be formed by methods such as drilling. It is often necessary to intersect such passages, so that one passage intersects with another passage at an intersection or transition.

One problem often encountered when designing and using such components is that stress concentrations can arise at the intersections or transitions when the passages are under internal pressure. For example, in hydraulic applications such as pumps, the passages carry high-pressure fluid which acts upon the walls of the passages to create high stress concentrations, which can lead to failure of the component by fracture or deformation close to or at the intersection. In some applications, such as common rail fuel pumps, the stresses generated at such intersections can be extremely high due to the considerable pressure of fuel that is generated within the pump.

It has been previously shown that the stress concentrations can be reduced somewhat by shaping the intersection at the end of one passage in the region at which it intersects the other passage, for example by radiusing the intersection. Radiusing the intersection reduces the presence of sharp features and thin regions of material at the intersection, which contribute to stress concentrations. A radiused intersection can be achieved by, for example, electrochemical machining or abrasive polishing of the intersection.

As engine technology develops, there is a requirement to increase the pressure at which fuel is injected to the engine, and correspondingly the components of the fuel injection system, including the pump, must be further improved with respect to the pressure at which they can be reliably used.

Against this background, it would be desirable to provide a component having intersecting passages in which the stress concentrations at the intersection between the passages are further reduced in comparison to previously known intersection shapes.

SUMMARY OF THE INVENTION

According to a first aspect of the present invention, there is provided a housing for use in high-pressure fluid applications, the housing being provided with a first passage defining a first axis and a second passage defining a second axis, wherein a third axis is mutually orthogonal to the first axis and the second axis. The first and second passages intersect at an opening defined by an intersection at one end of the second passage. The intersection defines a first internal dimension parallel to the first axis and a second internal dimension parallel to the third axis. The intersection is shaped so that, when sectioned on a plane normal to the second axis and not intersecting the first passage, the intersection defines an ellipse in the plane and centred on the second axis, the ellipse having a major axis equal in length to the second internal dimension and a minor axis equal in length to the first internal, dimension; a rectangle with a first vertex on the first axis, a second vertex at an end of the minor axis of the ellipse, a third vertex at an end of the major axis of the ellipse and a fourth vertex outside the ellipse; and a diagonal which passes through the first vertex and the fourth vertex of the ellipse. A wall of the intersection describes a curve in the plane, the curve passing through the second vertex and the third vertex of the rectangle and a point which is outside the ellipse and which lies on a line which extends from the first vertex of the rectangle and at an angle from the diagonal. The point which is outside the ellipse is offset from an intersection of the line with the ellipse by an offset distance.

The curve described by the wall of the intersection in the plane is a preferably a spline curve, so that the curve is a smooth function which passes through the second and third vertices and the point which is outside the ellipse.

The first internal dimension may be an internal height dimension of the intersection, and the second internal dimension may be an internal width dimension of the intersection. The second internal dimension is preferably larger than the first internal dimension. The second internal dimension may, for example, be at least 5% larger than the first internal dimension. For example, in a particularly preferred embodiment, the second internal dimension is 30% larger than the first internal dimension.

The angle between the line and the diagonal is preferably between −20° and +20°, and is more preferably between −15° and +15°. The angle may, for example, be +1°, +10%, −15° or +20°, or may be zero.

The offset distance is preferably at least 1% of the second internal dimension, and is more preferably between 2% and 12% of the second internal dimension. The offset distance may, for example, be 2%, 4.5%, 12% or 18% of the second internal dimension.

In one arrangement, at least two portions of the intersection each describe elliptical arcs defining two coplanar non-coincident ellipses, wherein each ellipse has a minor axis parallel to the first axis and a major axis parallel to the third axis. Preferably, the ratio of the major axis of an ellipse defined by an elliptical arc to the minor axis of the ellipse defined by the elliptical arc is at least 1.1 to 1. The ratio may, for example, be between 1.5 and 2.5 to 1.

The ratio of the major axis of an ellipse defined by an elliptical arc to the minor axis of the ellipse defined by the elliptical arc may have a non-constant value when the intersection is sectioned on parallel planes normal to the second axis and not intersecting the first passage. In this way, the shape of the intersection may vary in a direction parallel to the second axis. The second passage may be substantially cylindrical about the second axis, and the centre of each ellipse defined by an elliptical arc is offset from the second axis in a direction parallel to the first axis.

In any embodiment of the invention, the shape of the intersection may vary in a direction parallel to the second axis. For example, the intersection may comprise a radiused region adjacent to an internal wall of the first passage. Such a radiused region 'smooths' the edges of the intersection where it meets the first passage, which serves to reduce stress concentrations at the intersection, compared to the stress concentrations that would arise in a similar intersection without a radiused region.

Instead of, or in addition to, a radiused region, the first internal dimension may increase from a minimum value adjacent to the second passage to a maximum value adjacent to the first passage, so that the intersection has a flared or tapered shape when sectioned in a plane containing the first and second axes. Alternatively, the first internal dimension may be substantially constant over a substantial portion of the intersection between the second passage and the first passage, so that the intersection has a straight-walled shape when sectioned in a plane containing the first and second axes. In another alternative embodiment, the first internal dimension decreases from a maximum value adjacent to the second passage over at least a portion of the intersection, so that the intersection has a constricted shape when sectioned in a plane containing the first and second axes.

Likewise, the second internal dimension may increase from a minimum value adjacent to the second passage to a maximum value adjacent to the first passage, so that the intersection has a flared or tapered shape when sectioned in a plane normal to the first axis and containing the second axis. Alternatively, the second internal dimension may be substantially constant over a substantial portion of the intersection between the second passage and the first passage, so that the intersection has a straight-walled shape when sectioned in a plane normal to the first axis and containing the second axis. In another alternative embodiment, the second internal dimension decreases from a maximum value adjacent to the second passage over at least a portion of the intersection, so that the intersection has a constricted shape when sectioned in a plane normal to the first axis and containing the second axis.

If both the first and second internal dimensions increase from a minimum value adjacent to the second passage to a maximum value adjacent to the first passage, then it is preferable that the increase in the second internal dimension is greater than the increase in the first internal dimension over at least part of the intersection.

According to a second aspect of the present invention, there is provided a housing for use in high-pressure fluid applications, the housing being provided with a first passage defining a first axis and a second passage defining a second axis, wherein a third axis is mutually orthogonal to the first axis and the second axis, and wherein the passages intersect at an opening defined by an intersection at one end of the second passage, the intersection being shaped so that, when sectioned on a plane normal to the second axis and not intersecting the first passage, at least two portions of the intersection each describe elliptical arcs defining two coplanar non-coincident ellipses, wherein each ellipse has a minor axis parallel to the first axis and a major axis parallel to the third axis. Preferably, the ratio of the major axis of the ellipse to the minor axis of the ellipse is at least 1.1 to 1, and may be between 1.5 and 2.5 to 1.

The ratio of the major axis of the ellipse to the minor axis of the ellipse may have a non-constant value when the intersection is sectioned on parallel planes normal to the second axis and not intersecting the first passage, so that the shape of the intersection varies in a direction parallel to the second axis. The second passage may be substantially cylindrical about the second axis, and the centre of each ellipse is offset from the second axis in a direction parallel to the first axis.

The invention may find application in any situation where high-pressure fluid must pass between two or more intersecting passages. For example, the housing according to the invention may take the form of a housing for a high-pressure fuel pump for an internal combustion engine, the first passage defining a bore for receiving a plunger of the pump, and the second passage defining a flow passage for high pressure fuel into and/or out of the bore. A third passage may be provided which meets the first passage at an intersection which is shaped as previously described so that, for example, the second passage may form an inlet passage for the flow of fuel into the bore, and the third passage may form an outlet passage for the flow of fuel out of the bore. The invention therefore extends to a fuel pump comprising a housing as previously described.

The shape of the intersection in the present invention is particularly beneficial in terms of reducing stress concentrations in the housing. The Applicant has shown that such a shape offers a significantly improved reduction in stress concentration when compared to previously known shaped intersections.

BRIEF DESCRIPTION OF THE DRAWINGS

The present invention will now be described, by way of example only, with reference to the accompanying drawings in which:

FIG. 9b is a sectional view taken on a vertical plane of the intersection of FIG. 9a;

FIG. 10b is a sectional view taken on a vertical plane of the intersection of FIG. 10a;

FIG. 11b is a sectional view taken on a vertical plane of the intersection of FIG. 11a.

DETAILED DESCRIPTION OF THE EMBODIMENTS

Figure 1:
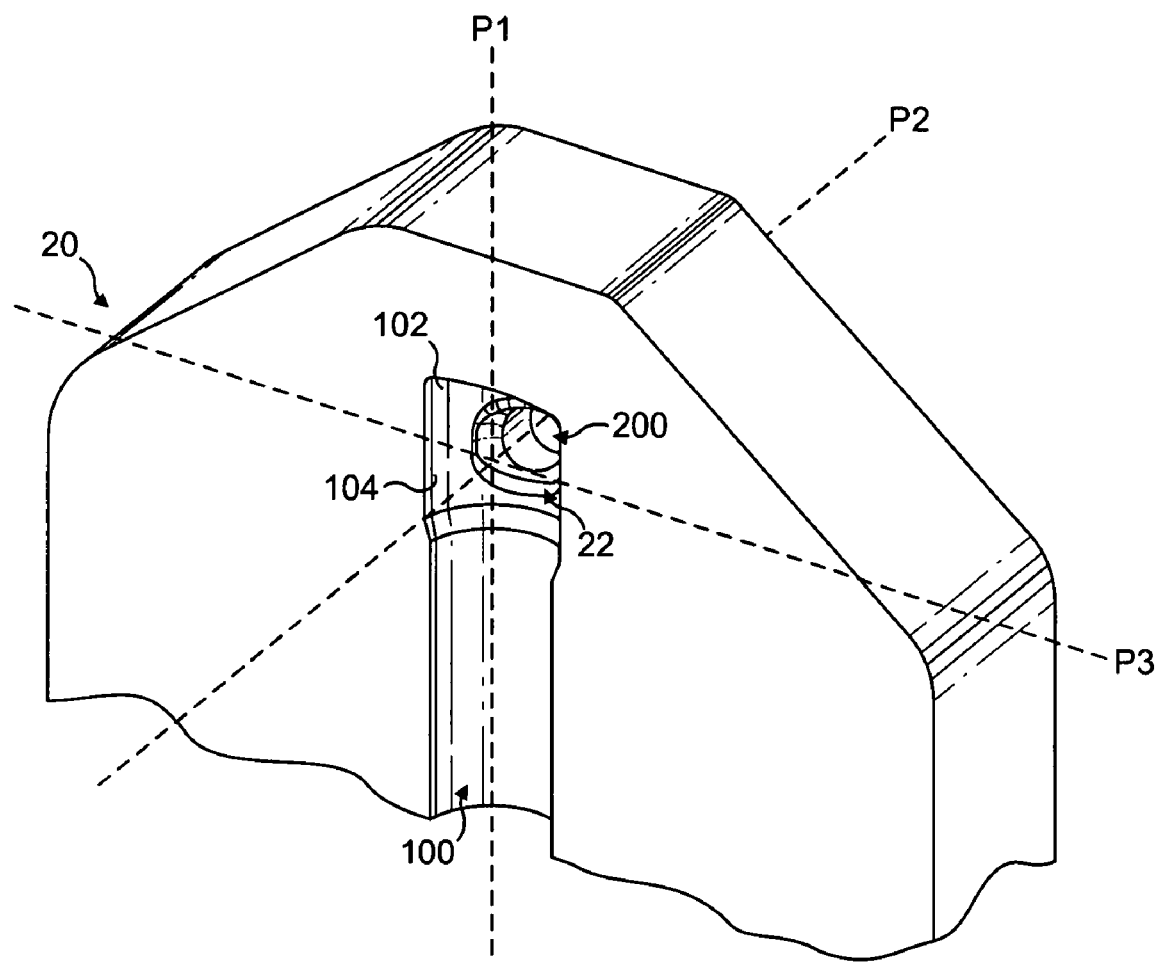
FIG. 1 is a perspective view of an intersection between passages in a housing according to a first embodiment of the present invention.

As shown generally in FIG. 1, in a first embodiment of the invention there is provided a part comprising a metal housing 20 suitable for use in high pressure fluid applications. The housing 20 is provided with a first passage 100 and a second passage 200. The first and second passages 100, 200 are generally cylindrical to define a first axis P1 coincident with the cylinder axis of the first passage 100 and a second axis P2 coincident with the cylinder axis of the second passage 200. The first and second axes P1, P2 define a third axis P3 which is mutually orthogonal to the first and second axes P1, P2.

The first passage 100 has a larger diameter than the second passage 200 and has an increased diameter over a region next to the end of the passage, so as to form an enlarged chamber 102 of the first passage 100. The first and second passages 100, 200 intersect orthogonally to define a region of intersection, hereafter referred to as an intersection and indicated generally at 22 in FIG. 1. The intersection 22 is located adjacent to the chamber 102 of the first passage 100, so that the second passage 200 opens into the chamber 102 of the first passage 100.

Figure 2:
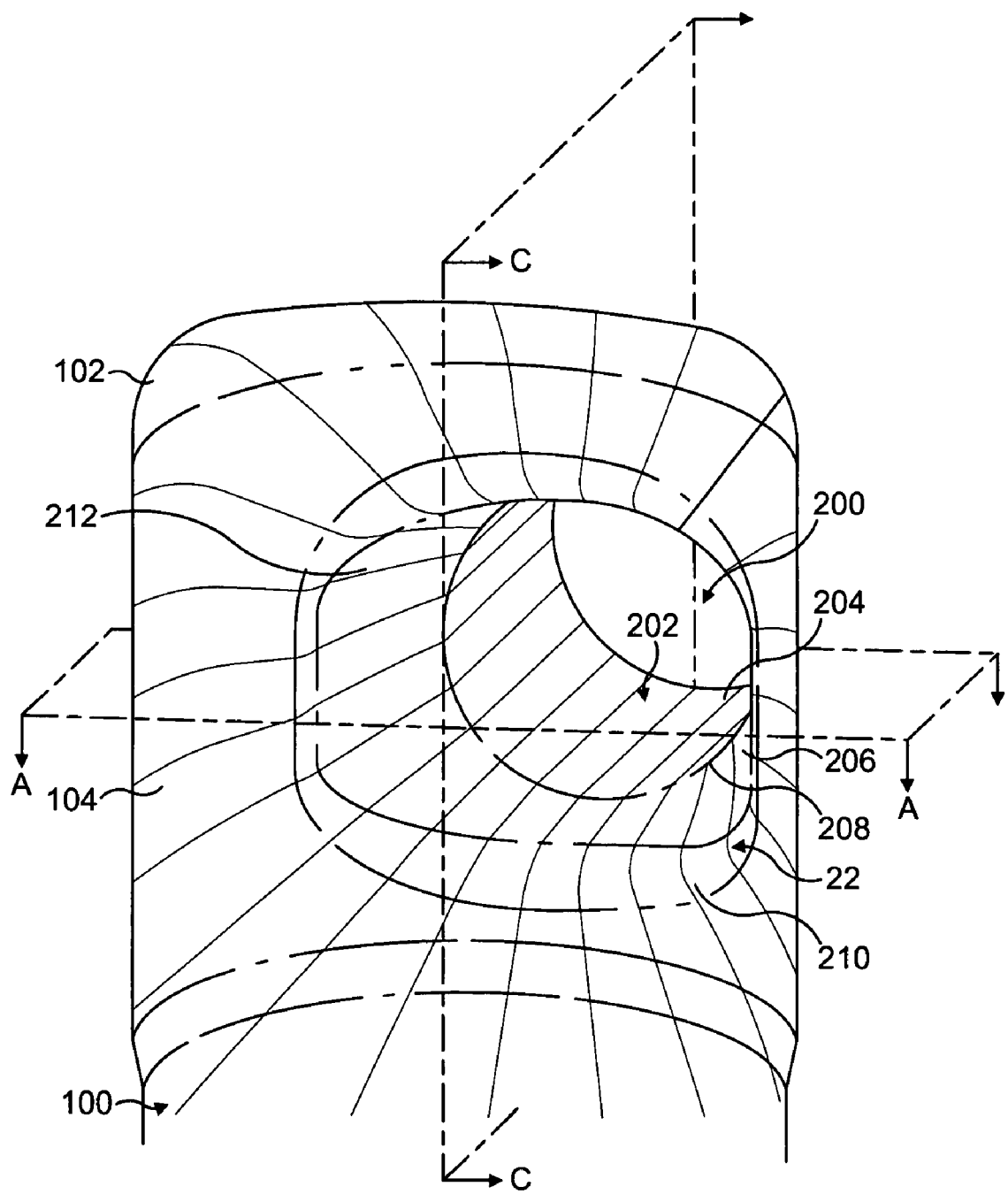
FIG. 2 is a more detailed perspective view of the intersection of FIG. 1.
Figure 3:
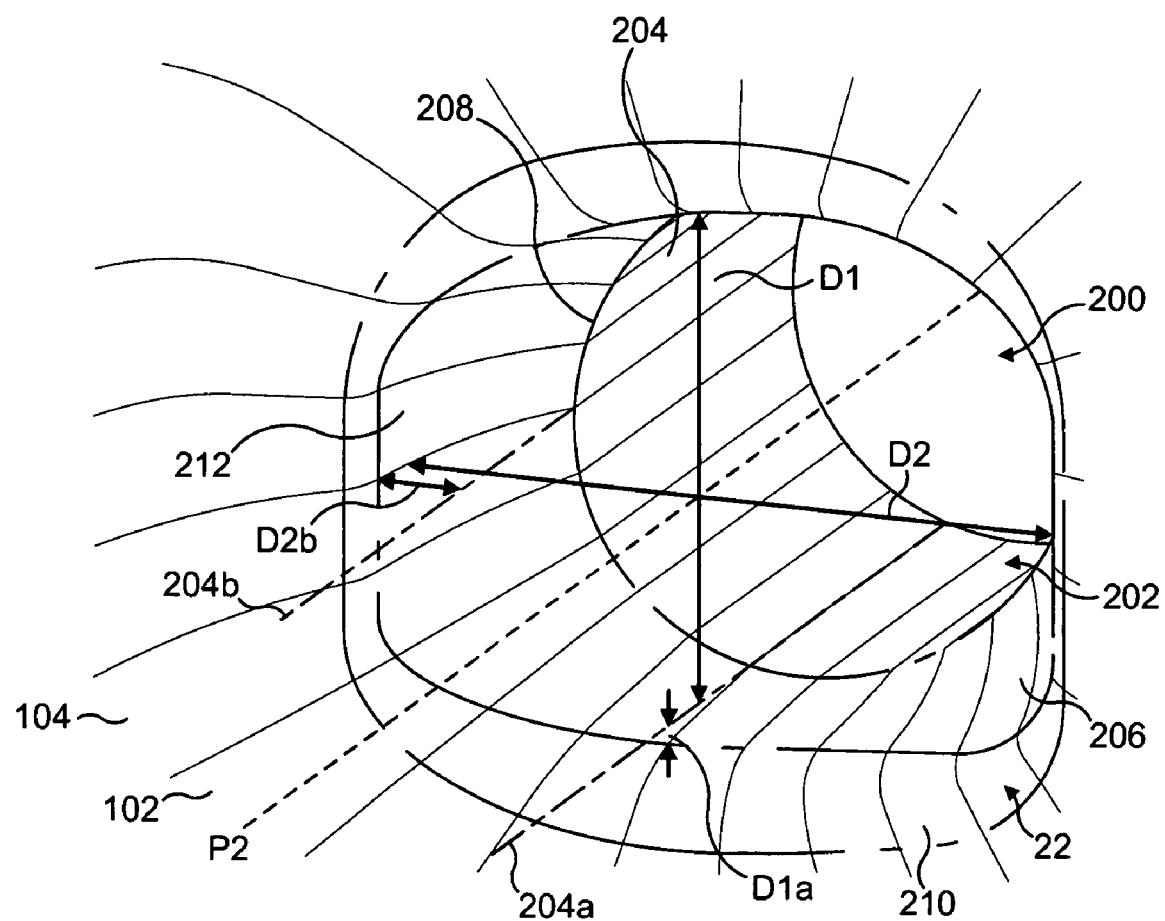
FIG. 3 is a yet more detailed perspective view of the intersection of FIG. 1.
Figure 4:
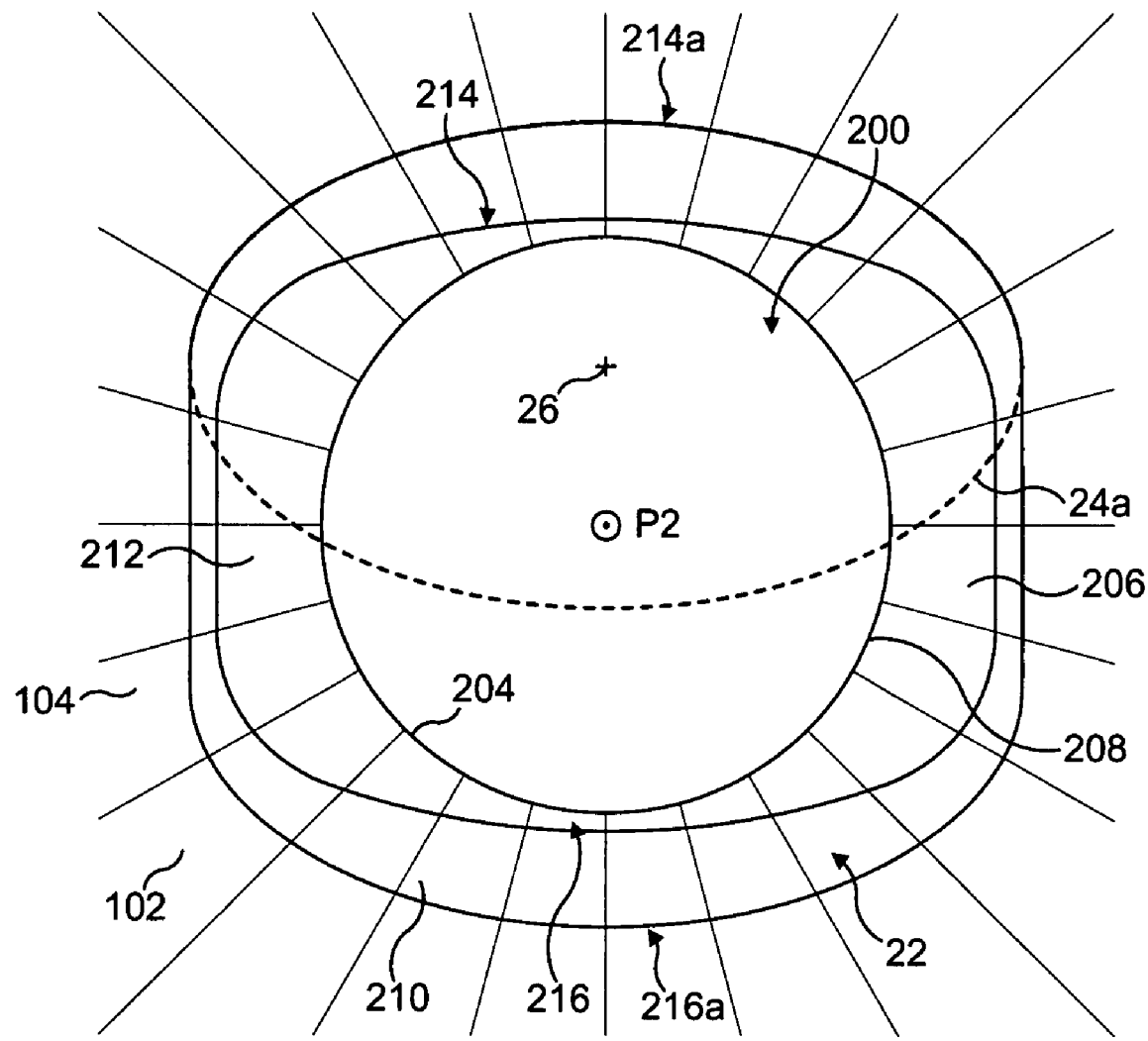
FIG. 4 is a side view of the intersection of FIG. 1.

Referring to FIGS. 2, 3 and 4, the intersection 22 is shaped so as to define a non-circular opening into the first passage 100. In other words, material is removed from the wall 104 of the first passage 100 so that, when viewed along the axis P2 (as seen in FIG. 4), the shape of the intersection 22 is not circular as would be the case if no material were removed. In this context, therefore, the intersection 22 can be defined as the region over which material has been removed, which includes the actual opening which the second passage 200 makes within the wall 104 of the first passage 100.

The shape of the intersection 22 will now be described in detail. As can be seen from FIGS. 2, 3 and 4 in particular, the wall 202 of the second passage 200 comprises a cylindrical region 204 and a flared region 206. The flared region 206 forms a part of the intersection 22 and is separated from the cylindrical region 204 at a transition 208. As shown in FIG. 3, the intersection 22 can be described in terms of an internal height dimension D1 which is parallel to the first axis P1, and an internal width dimension D2 which is parallel to the third axis P3. Each dimension D1, D2 may be taken at any point passing through the second axis P2, so that the first and second dimensions D1, D2 respectively capture the maximum internal height and the maximum internal width of the intersection 22 at a given distance from the transition 208. At the transition 208, the height dimension D1 and the width dimension D2 have substantially the same value, each being substantially equal to the diameter of the cylindrical portion 204 of the second passage 200.

Away from the transition 208, within the flared region 206, the height and width dimensions D1, D2 have larger values than those found at the transition 208. The dimensions D1, D2 of the intersection 22 have increasingly larger values when taken at successive points moving away from the transition 208 towards the first passage 100 along the direction of the second axis P2.

The intersection 22 also comprises a radiused region 210, which extends between the flared region 206 of the second passage 200 and the wall 104 of the first passage 100. Within the radiused region 210, the rate of increase of the dimensions D1, D2 (that is, the relative increase in each dimension D1, D2 per unit displacement away from the transition 208) is larger than the rate of increase in the flared region 206. The radiused region provides a smooth transition between the wall 212 of the flared region 206 of the intersection 22 and the wall 104 of the first passage 100. This can be seen for the width dimension D2 in FIG. 5, which is a section through the housing taken normal to the first axis P1.

Figure 5:
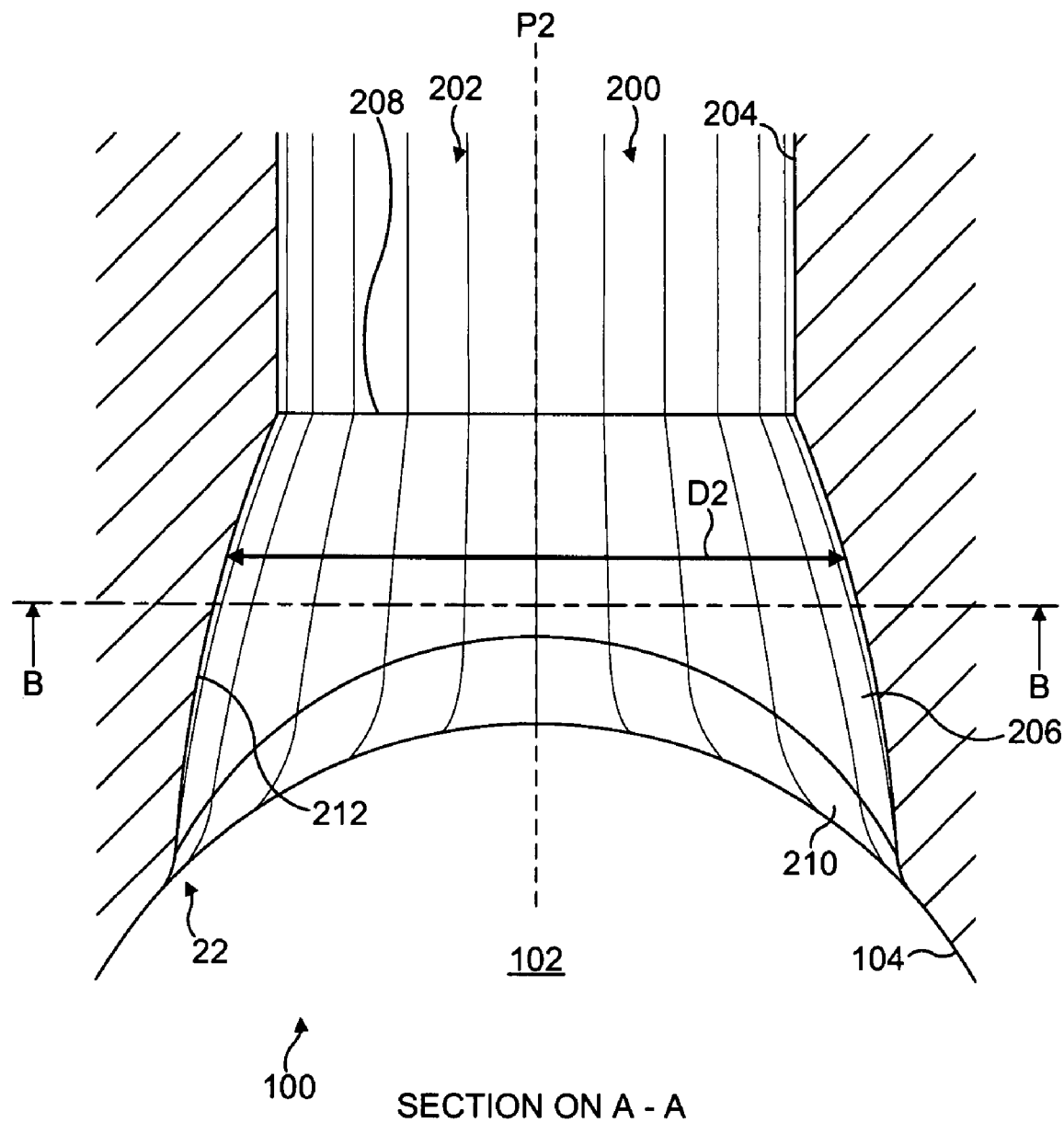
FIG. 5 is a sectional view taken on a horizontal plane and showing the shape of the intersection of FIG. 1.

As shown most clearly in FIG. 5, the width dimension D2 of the flared region 206 increases to a progressively lesser extent on moving from the transition 208 towards the radiused region 210. Although not clearly visible in the drawings, the height dimension D1 of the flared region 206 likewise increases to a progressively lesser extent on moving from the transition 208 towards the radiused region 210.

Referring again to FIG. 3, the increase in the height dimension D1 between the transition 208 and the beginning of the radiused region 210 is less than the increase in the width dimension D2 between the same two points. As a result, the intersection is flared to a greater extent in the width direction, parallel to the third axis P3, than it is in the height direction, parallel to the first axis P1. In FIG. 3, the dimension D1$a$ shows, for the height direction, the deviation of the wall of the intersection within the flared region 206 from a line 204$a$ extrapolated from the wall 204 of the cylindrical region 202 of the second passage 200. Likewise, the dimension D2$b$ in FIG. 3 shows, for the width direction, the deviation of the wall of the intersection within the flared region 206 from a line 204$b$ extrapolated from the wall 204 of the cylindrical region 202 of the second passage 200.

Figure 6:
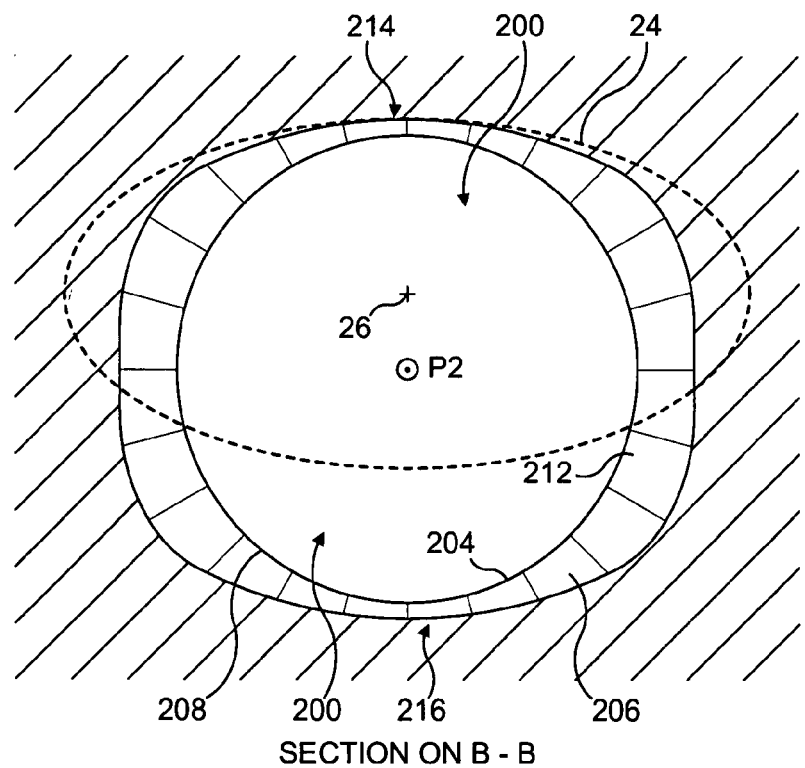
FIG. 6 is a sectional view taken on a vertical plane in the vicinity of the intersection of FIG. 1.

Referring now to FIG. 6, which is a section through the intersection on a plane normal to the second axis P2 and passing through the flared region 206 of the intersection, it can be seen that a first flattened portion 214 of the wall 212 of the flared region 206 describes an elliptical arc. To aid visualisation of the elliptical arc, the ellipse 24 defined by the arc is shown as a dashed line in FIG. 6. The centre 26 of the ellipse 24 is not coincident with the second axis P2, but instead is offset from the second axis P2 in a direction parallel to the first axis P1.

The ellipse 24 has a major axis parallel to the third axis P3 and a minor axis parallel to the first axis P1. The aspect ratio (that is, the ratio of the major axis to the minor axis) of the ellipse 24 defined by the wall 212 in the first portion 214 varies throughout the intersection 22. In other words, the aspect ratio of the ellipse 24 depends upon the position of the plane normal to the second axis P2 upon which the section is taken. On the section shown in FIG. 6, which is taken on a plane lying approximately half-way between the transition 208 and the edge of the intersection where it meets the wall 104 of the first passage 100 furthest from the transition 208 (see FIG. 5), the ellipse 24 has an aspect ratio of approximately 2 to 1.

A second flattened portion 216 of the wall 212 of the flared region 206 likewise defines an elliptical arc. The ellipse (not shown) defined by the arc of the second portion 216 is substantially the same shape and size as the ellipse 24 defined by the arc of the first portion 214 of the wall 212 when a section is taken on a given plane, but has a centre which is offset from the second axis P2 in the opposite direction from that of the ellipse 24 defined by the arc of the first portion 214, so that the ellipses are offset in a direction parallel to the first axis P1.

In this way, two flattened portions 214, 216 are provided within the flared region 206 of the intersection 22. The flattened portions 214, 216 reside on opposite sides of the intersection 22 and are separated along a direction parallel to the first axis P1. By virtue of the elliptical arcs described by the portions 214, 216, these portions 214, 216 are flattened with respect to the rest of the flared region 206 of the intersection 22.

The flared region 206 of the intersection 22 is distinct from a flared region which defines a conical taper or an elliptical shape because, as will be appreciated, the portions 214, 216 of the flared region 206 define two distinct co-planar but non-coincident ellipses 24 (only one of which is shown in FIG. 6). The centres of the ellipses 24 are offset from the centre of the intersection 22, represented by the second axis P2.

Returning to FIG. 4, it can be seen that an elliptical arc is also described by a flattened portion 214a of the wall of the radiused region 210. The ellipse 24a defined by this arc is indicated by the dashed line in FIG. 4. At the edge of the intersection 22 (that is, at the boundary between the radiused region 210 and the wall 104 of the first passage 100), the ellipse 24a defined by the arc of the flattened portion 214a has an aspect ratio of 5 to 3. Once again, the centre 26a of the ellipse 24a is offset from the second axis P2 in a direction parallel to the first axis P1. A second flattened portion 216a likewise describes an elliptical arc which defines an ellipse (not shown) with the same shape and size as the ellipse indicated at 24a in FIG. 4 but with its centre offset from the second axis P2 in the opposite direction along the first axis P1.

It will be appreciated that, when taken together, the flattened portions on one side of the intersection form a continuous surface which extends from the transition 208 to the wall 104 of the first passage 100. For example, the flattened portion indicated at 214 in the flared region 206 forms a continuous surface with the flattened portion indicated at 214a in the radiused region 210.

As mentioned previously, the aspect ratio of the ellipses 24, 24a defined by the arcs of the flattened regions 214, 214a depends on the position within the intersection 22 at which the measurement of the ellipse (24, 24a) is taken. In general terms, however, the ellipses 24, 24a have aspect ratios of at least 1.1 to 1, and preferably the aspect ratios lie in the range between 1.5 to 1 and 2.5 to 1.

The shape of the intersection between the flattened portions 214, 214a, 216, 216a may differ from that shown in the accompanying drawings. In general, the shape of the intersection in a side view such as that shown in FIG. 4 or a cross section such as that shown in FIG. 6 should describe a smooth curve extending from one flattened portion 214, 214a to the other flattened portion 216, 216a.

Figure 7:
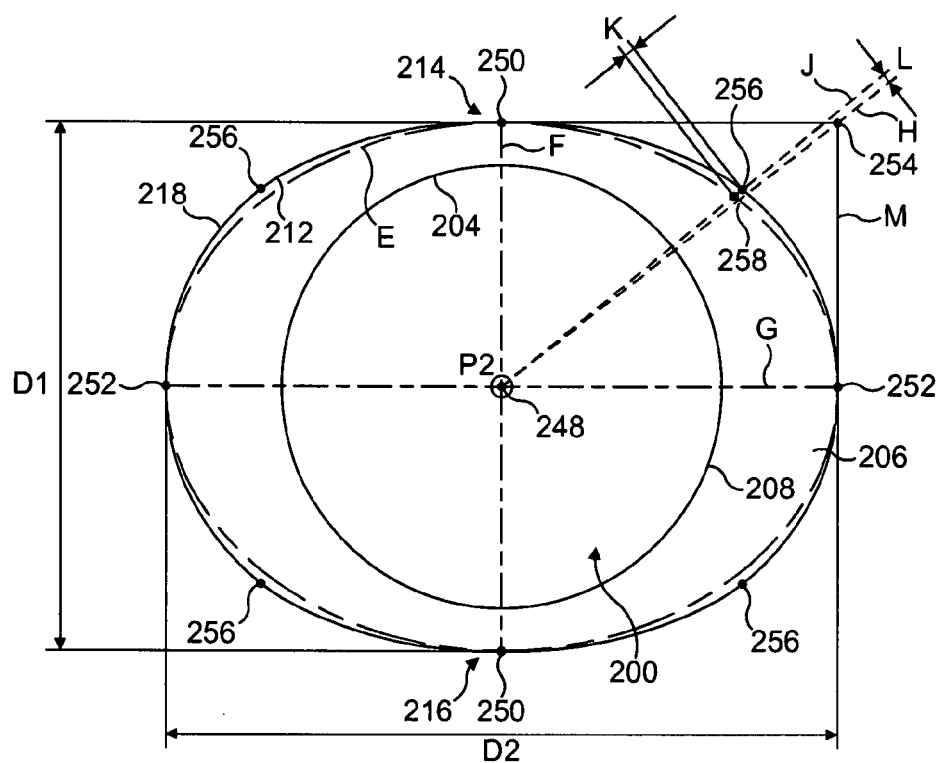
FIG. 7 is a sectional view taken on a vertical plane in the vicinity of an intersection in a housing according to a second embodiment of the present invention, and showing construction lines.

The shape of the intersection will now be described in general terms with reference to FIG. 7, which shows an intersection in a housing according to a second embodiment of the invention. FIG. 7 is a cross-section taken on a vertical plane through the intersection similar to the plane B-B shown in FIG. 5. Sectional hatching has been omitted from FIG. 7 for clarity. The intersection is similar to that in the housing of the first embodiment of the invention, and like reference numerals will be used for like parts.

Construction lines E, F, G, H and J are shown on FIG. 7 to help define the shape that the wall 212 of the intersection creates where the wall 212 intersects the plane of the drawing of FIG. 7. The intersection has an internal width dimension D2 and an internal height dimension D1 which correspond respectively to the internal width and height dimensions shown in FIG. 3. Construction line E is an ellipse having a horizontal major axis equal in length to the internal width dimension D2 and a vertical minor axis equal in length to the internal height dimension D1. The centre of the ellipse of construction line E lies at a point 248 which is coincident with the second axis P2. As in the first embodiment of the invention, the second axis P2 lies along the cylinder axis of the second passage 200.

Construction line F is a vertical line which runs along the minor axis of the ellipse of construction line E, passing through the axis P2 and meeting construction line E at points 250 lying at each end of the minor axis of the ellipse of construction line E. Construction line G is a horizontal line which runs along the major axis of the ellipse of construction line E, passing through the axis P2 and meeting construction line E at points 252 lying at each end of the major axis of the ellipse of construction line E. The horizontal construction line F and the vertical construction line G together divide the intersection into four quadrants.

Considering the top, right-hand side quadrant of the intersection in FIG. 7, the point 250 at which construction lines F and E meet, the point 252 at which construction lines G and E meet and the point 248 at which construction lines F and G meet form three vertices of a rectangle M. The rectangle M is completed by a fourth vertex at a point 254 which lies outside the ellipse of construction line E.

Construction line H runs diagonally through the rectangle M and passes through the point 248 at where construction lines F and G intersect and the corner point 254 of the rectangle which lies outside the ellipse of construction line E. Construction line J passes through the point 248 at which construction lines F and G meet, and forms an angle L with construction line H.

A curve 218 formed by the wall 212 of the intersection where it intersects with the sectional plane of FIG. 7 is a smooth curve in the form of a cubic spline curve. The curve 218 passes through the points 250, 252 at each end of the minor and major axes of the ellipse of construction line E, where construction lines F and G respectively meet construction line E.

The curve 218 deviates from the elliptical shape of construction line E within each quadrant of the intersection. Taking the top-right quadrant as an example, the curve 218 intersects construction line J at a point 256 which lies outside the ellipse of construction line E. The point 256 at which the curve 218 intersects construction line J is offset from the point 258 at which construction line J intersects construction line E by an offset distance K in a direction away from the centre of the ellipse of construction line E. Similar points 256 through which the curve 218 passes are defined in the remaining three quadrants, so that the curve 218 is a spline curve which passes through eight points 250, 252, 256.

As in the first embodiment, the first and second flattened regions 214, 216 of the intersection define elliptical arcs as previously described.

To achieve an optimum reduction in stress, values of the angle L and the offset distance K shown in FIG. 7 can be selected as appropriate. The Applicant has determined that a particularly beneficial reduction in stress concentration at the intersection can be achieved when the offset distance K lies within the range between 2% and 12% of the internal width dimension D2, and when the angle L lies within the range between −20° and +20°. Angle L has a positive sign when construction line J lies between construction line H and the point 250 where construction line F meets construction line E, and has a negative sign when construction line J lies between construction line H and the point 252 where construction line G meets construction line E.

Furthermore, it is desirable that the value of the internal width dimension D2 is greater than the internal height dimension D1.

In the embodiment shown in FIG. 7, the angle L has a value of +1°, the offset distance K is equal to 2% of the internal width dimension D2, and the internal width dimension D2 is 1.3 times the internal height dimension D1.

Further examples of intersection shapes according to the present invention are shown in FIGS. 8a to 8e, in which like reference signs have been used for like parts and construction lines as previously described.

Figure 8A:
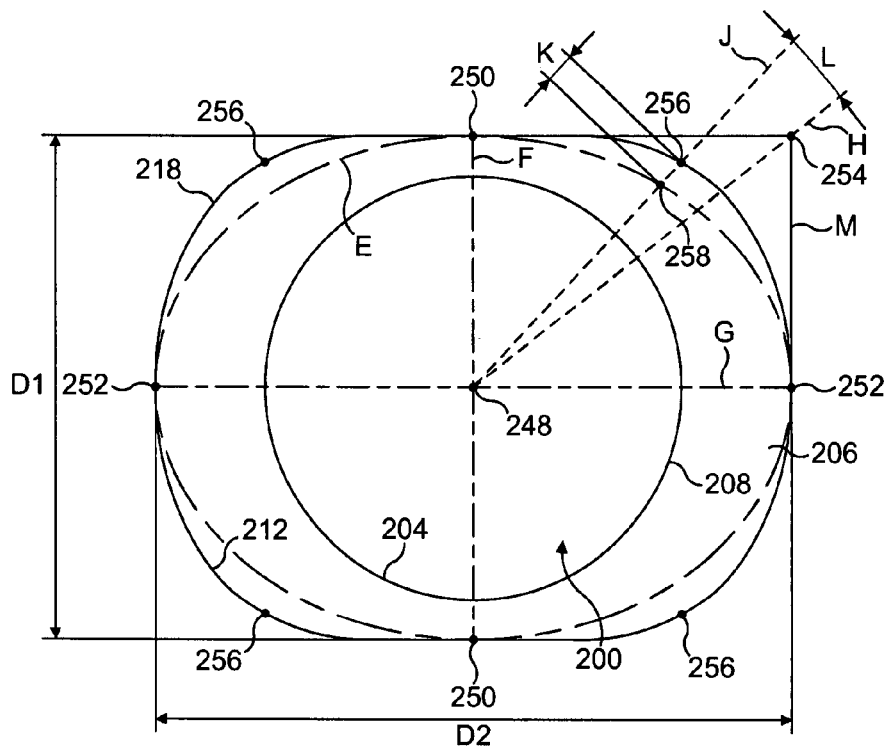
FIG. 8a is a sectional view similar to that of FIG. 7 of an intersection in a housing according to a third embodiment of the present invention.

FIG. 8a shows an intersection in a housing according to a third embodiment of the present invention, in which the offset distance K is 4.5% of the internal width dimension D2, and the angle L is 10°.

Figure 8B:
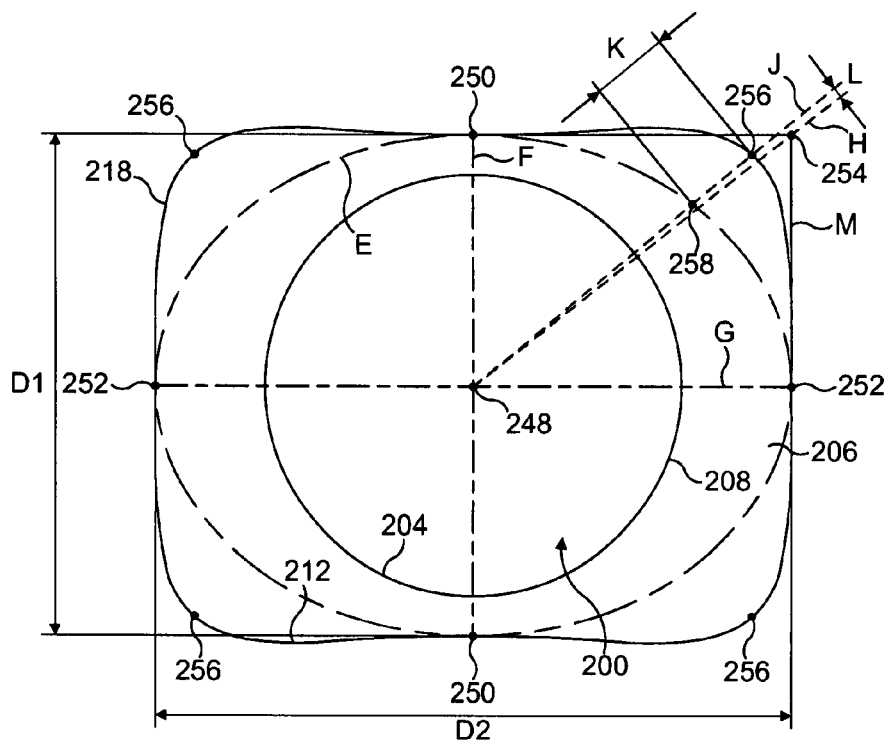
FIG. 8b is a sectional view similar to that of FIG. 7 of an intersection in a housing according to a fourth embodiment of the present invention.

FIG. 8b shows an intersection in a housing according to a fourth embodiment of the present invention, in which the offset distance K is 12% of the internal width dimension D2, and the angle L is 1°.

Figure 8C:
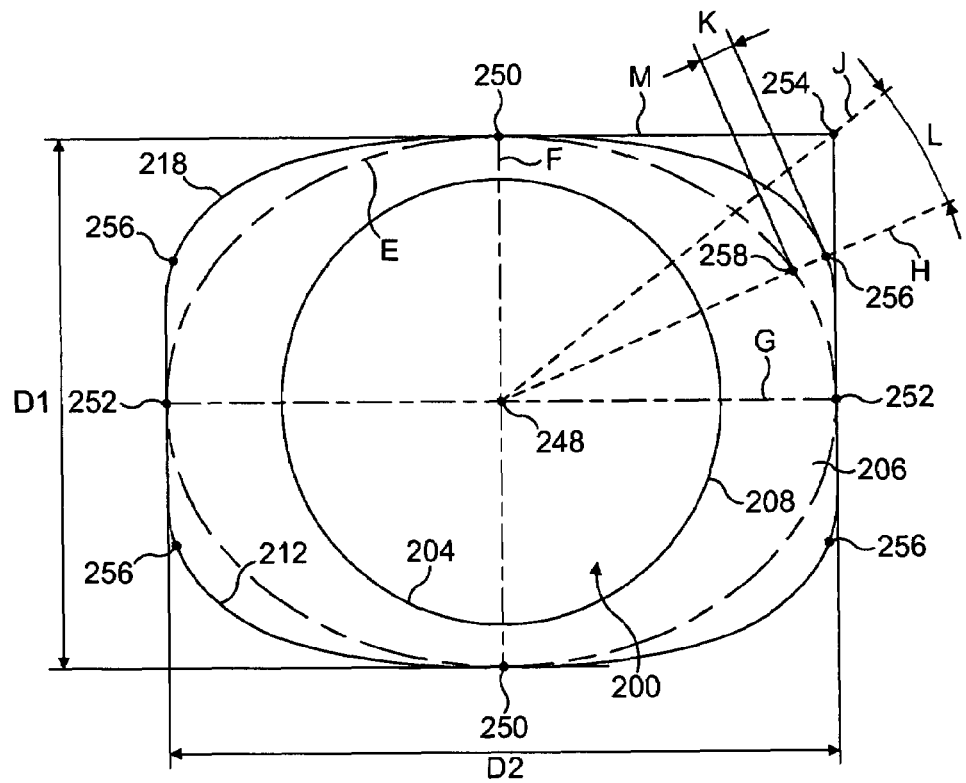
FIG. 8c is a sectional view similar to that of FIG. 7 of an intersection in a housing according to a fifth embodiment of the present invention.

FIG. 8c shows an intersection in a housing according to a fifth embodiment of the present invention, in which the offset distance K is 5% of the internal width dimension D2, and the angle L is −15°.

Figure 8D:
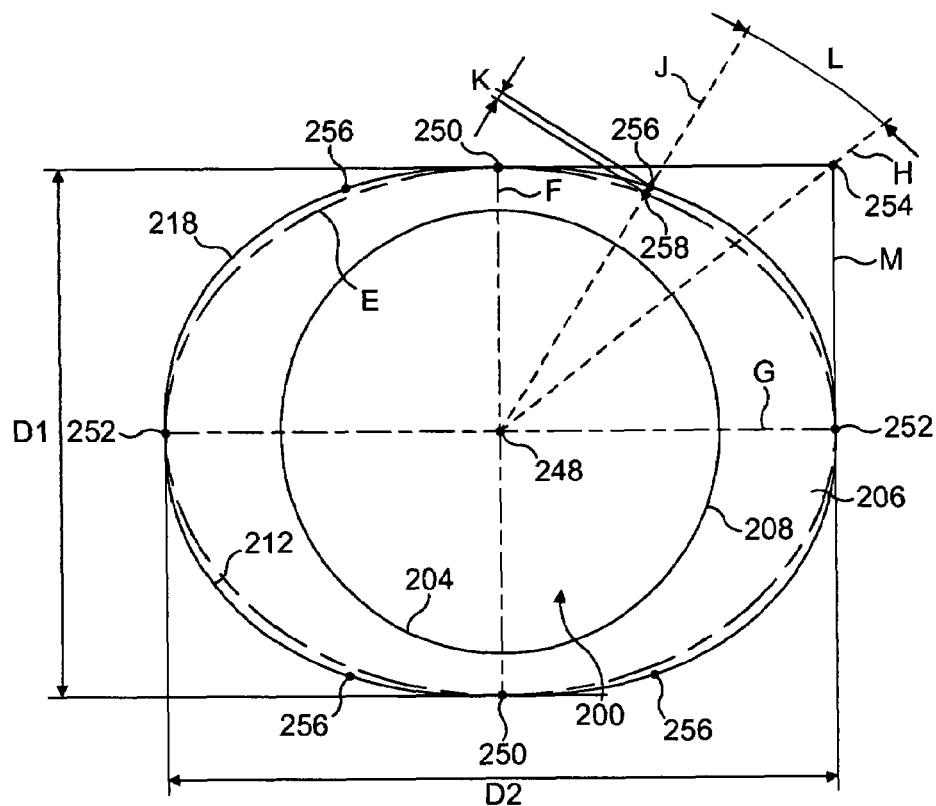
FIG. 8d is a sectional view similar to that of FIG. 7 of an intersection in a housing according to a sixth embodiment of the present invention.

FIG. 8d shows an intersection in a housing according to a sixth embodiment of the present invention, in which the offset distance K is 2% of the internal width dimension D2, and the angle L is 20°.

Figure 8E:
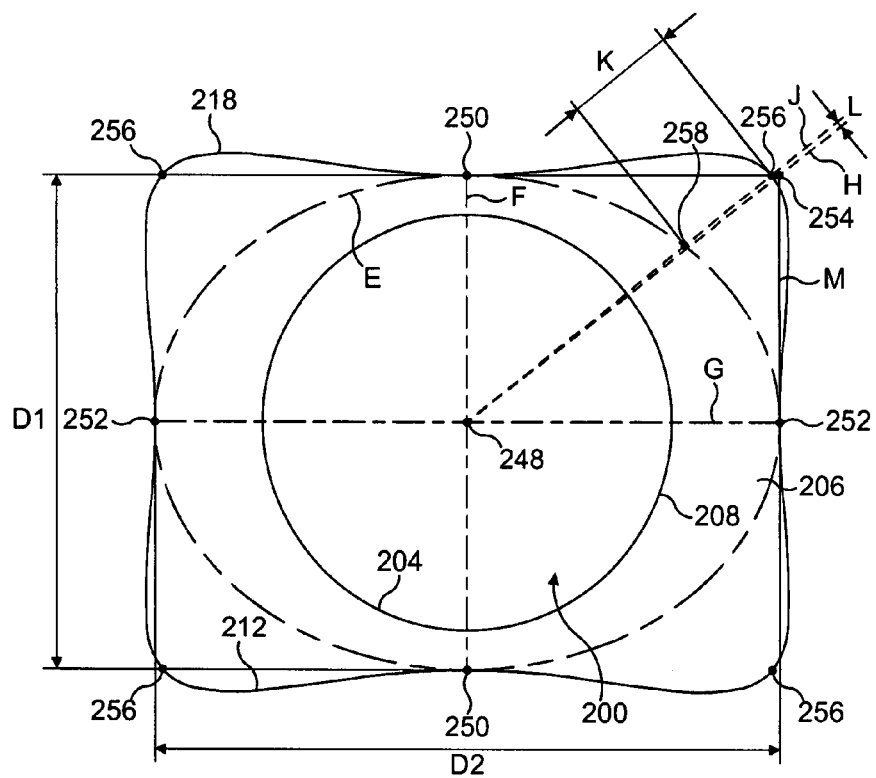
FIG. 8e is a sectional view similar to that of FIG. 7 of an intersection in a housing according to a seventh embodiment of the present invention.

FIG. 8e shows an intersection in a housing according to a seventh embodiment of the present invention, in which the offset distance K is 18% of the internal width dimension D2, and the angle L is 1°. Although the offset distance K lies outside the range 2% to 12% mentioned above, the intersection of FIG. 8e still provides a reduction in stress at the intersection when compared to conventional intersection shapes.

In FIGS. 7 and 8a to 8e, the curve 218 is symmetrical about a two-fold rotation axis coincident with the second axis P2. This need not be the case. Instead, each quadrant of the intersection may have values for the angle L and the offset distance K which differ from the corresponding values in one or more of the other quadrants. For example, the top two quadrants may have a first values for the angle L and the offset distance K, while the bottom two quadrants may have second values, dissimilar to the first values, for the angle L and the offset distance K. In this way, the intersection would have mirror symmetry in a vertical plane containing construction line F and the second axis P2, but would not have mirror symmetry in a horizontal plane.

While the embodiment of the invention described with reference to FIG. 7 has flattened regions 214, 216 which define elliptical arcs, as in the first embodiment of the invention, it will be appreciated that selection of certain values for the angle L and the offset distance K leads to intersection shapes having flattened regions which do not describe elliptical arcs, as shown for example in FIGS. 8a and 8b and particularly in FIG. 8e. Nevertheless, the Applicant has shown that such intersection shapes without flattened regions describing elliptical arcs are beneficial for reducing stress concentrations when compared to intersections which are conventionally shaped.

While the first and second embodiments of the invention comprise housings having intersections which are flared in both the width and height directions, as previously described, the intersections may be flared in only one or other of these directions. For example, in an eighth embodiment of the invention, a housing is provided in which the intersection is flared in the width direction only, as will now be described with reference to FIGS. 9a and 9b, in which like reference numerals are used for like features previously described.

Figure 9A:
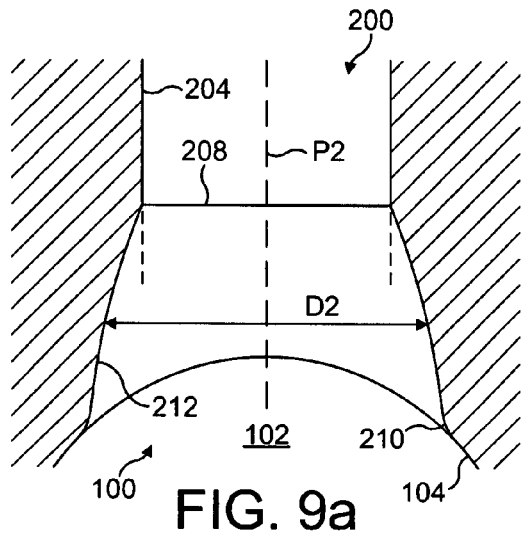
FIG. 9a is a sectional view taken on a horizontal plane of an intersection in a housing according to an eighth embodiment of the present invention.
Figure 9B:
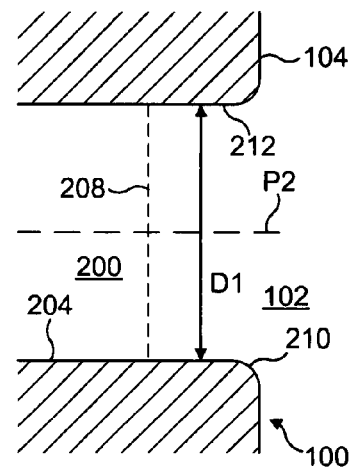

FIG. 9a is a cross-sectional view of the intersection in the housing of the eighth embodiment of the invention, taken on a horizontal plane through the intersection, similar to the plane A-A shown in FIG. 2. FIG. 9b is a cross-sectional view of the same intersection, taken on a vertical plane through the intersection, similar to the plane C-C shown in FIG. 2.

As shown in FIG. 9a, the internal width dimension D2 has an increasingly larger value when taken at successive points moving away from the transition 208 towards the first passage 100 along the direction of the second axis P2. Thus the intersection is flared in the width direction. However, as shown in FIG. 9b, the internal height dimension D1 has a constant value over substantially the whole intersection. Therefore, the height dimension D1 of the intersection is equal to the diameter of the second passage 200, and the intersection is not flared in the height direction. Instead, the intersection has straight sides in the height direction. As previously described, adjacent to the wall 104 of the first passage 100, the intersection has a radiused region 210 to avoid sharp edges of the intersection.

As will now be described, the intersection may be constricted, rather than flared, in one or both of the width or height directions.

Figure 10A:
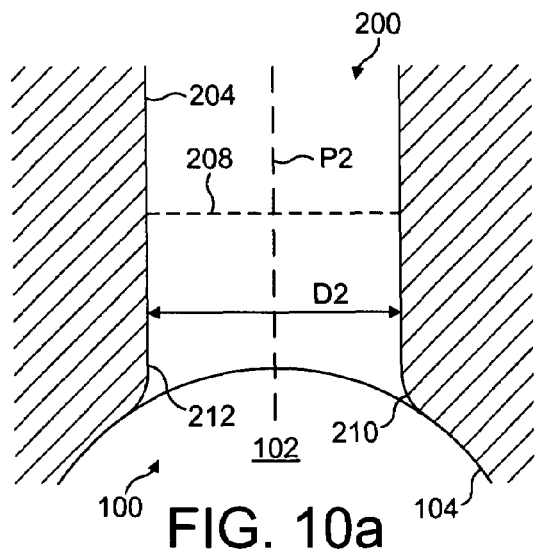
FIG. 10a is a sectional view taken on a horizontal plane of an intersection in a housing according to a ninth embodiment of the present invention.
Figure 10B:
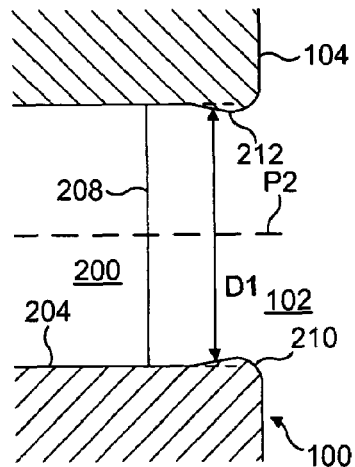

According to a ninth embodiment of the present invention, there is provided a housing having an intersection as shown in FIGS. 10a and 10b. The intersection is similar to those previously described, and like reference numerals will be used for like features. FIG. 10a is a cross-section of the intersection on a horizontal plane similar to the plane A-A shown in FIG. 2, and FIG. 10b is a cross-section of the intersection on a vertical plane similar to the plane C-C shown in FIG. 2.

As shown in FIG. 10a, the internal width dimension D2 of the intersection is constant over substantially the whole intersection, and is equal to the diameter of the second passage 200. Thus, the intersection has straight sides in the width direction. As shown in FIG. 10b, the internal height dimension D1 has a decreasing value when taken at successive points moving away from the transition 208 towards the first passage 100 along the direction of the second axis P2. Thus the intersection is constricted in the height direction, that is, the height of the intersection decreases when moving from the transition 208 to the first passage 100. As previously described, adjacent to the wall 104 of the first passage 100, the intersection has a radiused region 210 to avoid sharp edges of the intersection.

Figure 11A:
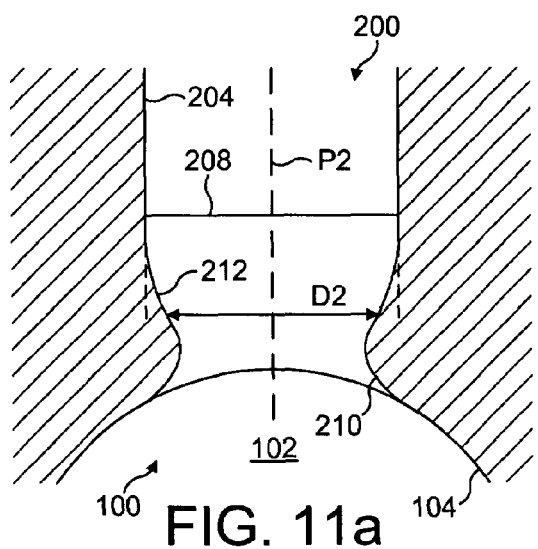
FIG. 11a is a sectional view taken on a horizontal plane of an intersection in a housing according to a tenth embodiment of the present invention.
Figure 11B:
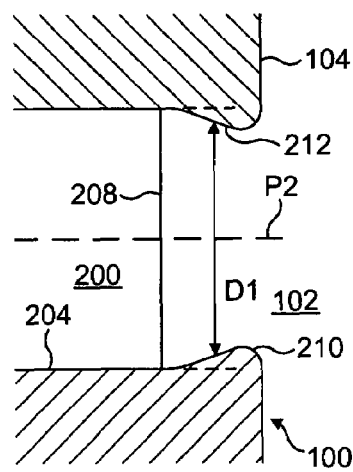

In a further example, according to a tenth embodiment of the present invention, there is provided a housing having an intersection as shown in FIGS. 11a and 11b. The intersection is similar to those previously described, and like reference numerals will be used for like features. FIG. 11a is a cross-section of the intersection on a horizontal plane similar to the plane A-A shown in FIG. 2, and FIG. 11b is a cross-section of the intersection on a vertical plane similar to the plane C-C shown in FIG. 2.

As shown in FIG. 11a, the internal width dimension D2 of the intersection has a decreasing value when taken at successive points moving away from the transition 208 towards the first passage 100 along the direction of the second axis P2. Likewise, the internal height dimension D1 of the intersection has a decreasing value when taken at successive points moving away from the transition 208 towards the first passage 100 along the direction of the second axis P2. Thus the intersection is constricted in both the width and height directions, that is, the width and the height of the intersection decrease when moving from the transition 208 to the first passage 100. As previously described, adjacent to the wall 104 of the first passage 100, the intersection has a radiused region 210 to avoid sharp edges of the intersection.

It will be appreciated that intersections may be shaped with any combination of flared, straight or constricted dimensions in the height and width dimensions so as to minimise the stress at the intersection for a given application. The Applicant has observed that, for example, providing a straight-sided intersection in the height direction improves the resistance to fracture of the intersection. The combinations described herein are intended as examples only.

The invention is particularly suited for use as a metal pump housing for pumping fuel at high pressure. In that case, the first passage comprises a plunger bore in which a plunger of the pump reciprocates, and the second passage comprises an inlet or an outlet passage of the pump. However, the invention could also be used in other hydraulic applications, and indeed in any application where it is desired that stress concentrations between two intersecting passages be avoided.

Several modifications to the described embodiments are possible without negating the benefit of the invention. For example, the first and second passages need not be orthogonal, but could intersect at a different angle. The passages may be drillings, or may be formed by other means such as erosion or moulding. More than two passages may be provided in the housing, and the intersection as previously described could be present wherever one passage intersects with another, or wherever necessary to allow high pressures to be employed in the housing.

One possible method of shaping an intersection between two passages in a housing according to the present invention will now be described. The passages may be formed using a conventional method, for example by drilling. The intersection between the passages is then shaped by an electrochemical machining (ECM) process, which is generally known in the art and will be only briefly described.

First, a pre-shaped electrode tool (which functions as a cathode) is introduced to the housing. Controlled anodic electrochemical dissolution of the metal of the housing (the anode) then takes place in an electrolysis process. A direct current with high density and low voltage is passed between the metal housing and the tool to dissolve the metal surface into metallic ions by a deplating reaction, with the result that the tool shape is approximately copied into the metal part. An electrolyte is forced to flow through the interelectrode gap with high velocity to intensify the mass/charge transfer near the anode and to remove the sludge (dissolution products) generated in the gap. If the housing is heat treated during manufacture, for example by carburising, the ECM process may take place before or after heat treating.

Figure 12:
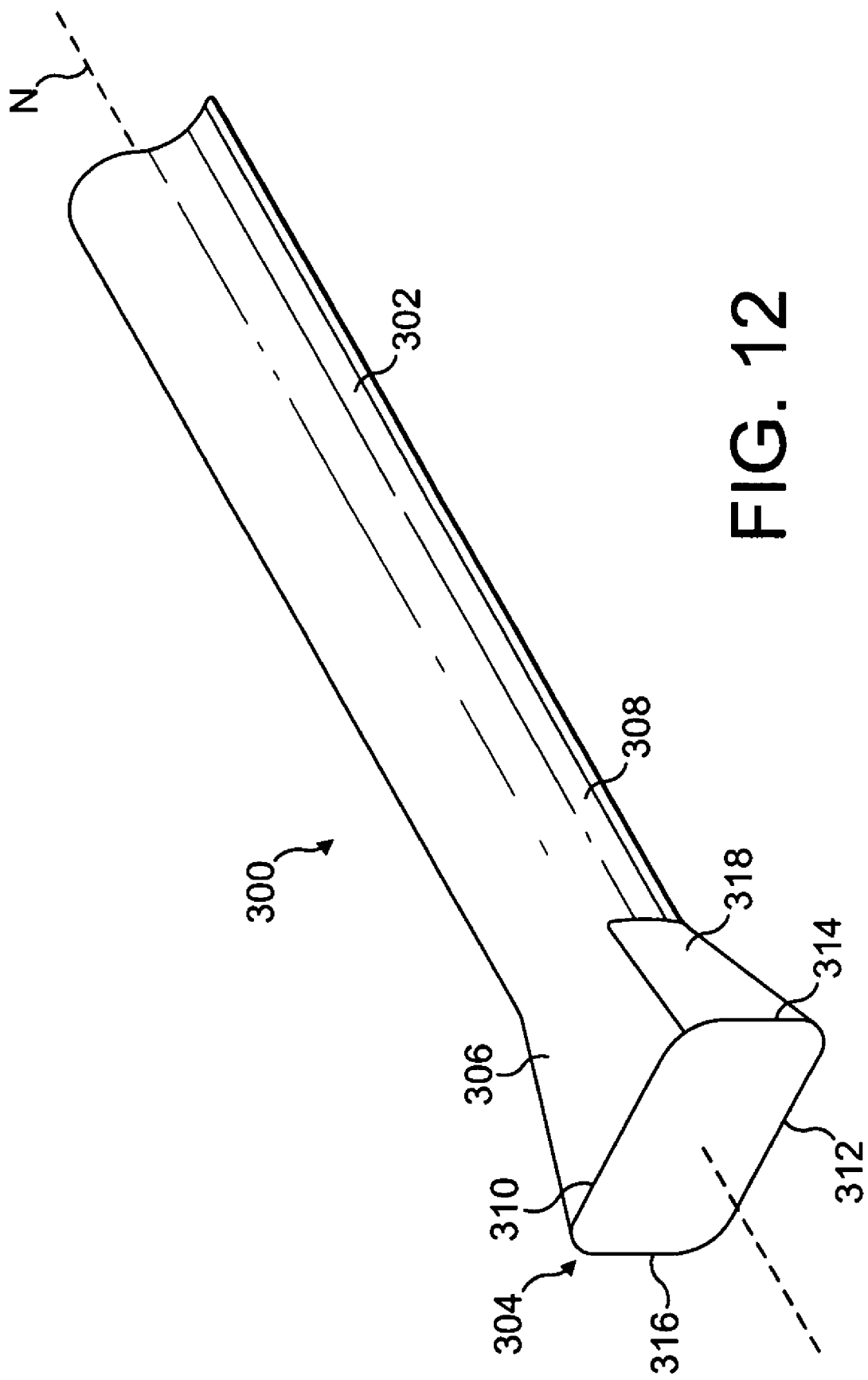
FIG. 12 is a perspective view of an electrode for use in the manufacture of the intersection shown in FIGS. 9a and 9b.

FIG. 12 shows an ECM electrode 300 suitable for shaping the intersection in the housing of the eighth embodiment of the invention. The electrode 300 comprises a main electrode stem 302 having a substantially uniform diameter along its length and an enlarged diameter electrode head 304 which comprises a tapered or flared portion 306 of the electrode 300. The head 304 of the electrode is flared only in the width direction, and not in the height direction (shown as the vertical direction on FIG. 12) so that, when viewed end-on, the head 304 of the electrode defines a generally rectangular shape with two longer parallel edges 310, 312 and two shorter convexly curved edges 314, 316.

The electrode 300 further comprises an insulation sleeve 308 which covers most of the surface of the electrode 300. In use, the insulation sleeve 308 prevents ECM dissolution of adjacent areas of the housing surface where machining is not necessary. Two side portions (one of which is indicated at 318) of the head 304, adjacent to the convexly curved edges 314, 316, are not covered by the insulation sleeve 308 and are exposed to allow machining of the housing surface adjacent to these regions 318.

In order to shape the intersection, the stem 302 of the electrode 300 is received within the second passage of the housing so that the longitudinal axis N of the electrode 300 is coaxial with the cylinder axis of the second passage of the housing, equivalent to the axis P2 in FIG. 3. The head 304 of the electrode is positioned close to where the second passage emerges in the wall of the first passage.

By virtue of the exposed regions 318, the intersection is selectively machined during the ECM process so as to produce an intersection which is flared in the width direction while remaining substantially straight in the height dimension, as shown in FIGS. 9a and 9b. Because some ECM dissolution takes place due to current and electrolyte flow in three dimensions around the electrode 300, the intersection takes on the characteristic shape comprising flattened regions defining elliptical arcs as previously described.

The invention claimed is:

1. A housing for use in high-pressure fluid applications, the housing being provided with:
    a first passage defining a first axis (P1); and
    a second passage defining a second axis (P2);
wherein:
    a third axis (P3) is mutually orthogonal to the first axis (P1) and the second axis (P2);
    the first and second passages intersect at an opening defined by an intersection at one end of the second passage; and
    the intersection defines a first internal dimension (D1) parallel to the first axis (P1) and a second internal dimension (D2) parallel to the third axis (P3);
the intersection being shaped so that, when sectioned on a plane normal to the second axis (P2) and not intersecting the first passage, the intersection defines:
    an ellipse (E) in the plane and centred on the second axis (P2), the ellipse having a major axis (G) equal in length to the second internal dimension (D2) and a minor axis (F) equal in length to the first internal dimension (D1);
    a rectangle (M) with a first vertex on the first axis (P2), a second vertex at an end of the minor axis (F) of the ellipse (E); a third vertex at an end of the major axis (G) of the ellipse (E) and a fourth vertex outside the ellipse (E); and
    a diagonal (H) which passes through the first vertex and the fourth vertex of the ellipse;
wherein:
    a wall of the intersection describes a curve in the plane, the curve passing through the second vertex and the third vertex of the rectangle (M) and a point which is outside the ellipse (E) and which lies on a line (J) which extends from the first vertex of the rectangle (M) and at an angle (L) from the diagonal (H); and
    the point is offset from an intersection of the line (J) with the ellipse (E) by an offset distance (K).

2. The housing as claimed in claim 1, wherein the second internal dimension (D2) is larger than the first internal dimension (D1).

3. The housing as claimed in claim 2, wherein the second internal dimension (D2) is at least 5% larger than the first internal dimension (D1).

4. The housing as claimed in claim 3, wherein the second internal dimension (D2) is 30% larger than the first internal dimension (D1).

5. The housing as claimed in claim 1, wherein the angle (L) is between −20° and +20°.

6. The housing as claimed in claim 5, wherein the angle (L) is zero.

7. The housing as claimed in claim 5, wherein the angle (L) is +1°.

8. The housing as claimed in claim 1, wherein the offset distance (K) is at least 1% of the second internal dimension (D2).

9. The housing as claimed in claim 8, wherein the offset distance (K) is between 2% and 12% of the second internal dimension (D2).

10. The housing as claimed in claim 1, wherein at least two portions of the intersection each describe elliptical arcs defining two coplanar non-coincident ellipses, wherein each ellipse has a minor axis parallel to the first axis (P1) and a major axis parallel to the third axis (P3).

11. The housing as claimed in claim 10, wherein the ratio of the major axis of the ellipse to the minor axis of the ellipse is at least 1.1 to 1.

12. The housing as claimed in claim 10, wherein the ratio of the major axis of the ellipse to the minor axis of the ellipse has a non-constant value when the intersection is sectioned on parallel planes normal to the second axis (P2) and not intersecting the first passage.

13. The housing as claimed in claim 10, wherein the second passage is substantially cylindrical about the second axis (P2), and the centre of each ellipse is offset from the second axis (P2) in a direction parallel to the first axis (P1).

14. The housing as claimed in claim 1, wherein the intersection further comprises a radiused region adjacent to an internal wall of the first passage.

15. The housing as claimed in claim 1, wherein the first internal dimension (D1) increases from a minimum value adjacent to the second passage to a maximum value adjacent to the first passage.

16. The housing as claimed in claim 1, wherein the first internal dimension (D1) is substantially constant over a substantial portion of the intersection between the second passage and the first passage.

17. The housing as claimed in claim 1, wherein the first internal dimension (D1) decreases from a maximum value adjacent to the second passage over at least a portion of the intersection.

18. The housing as claimed in claim 1, wherein the second internal dimension (D2) increases from a minimum value adjacent to the second passage to a maximum value adjacent to the first passage.

19. The housing as claimed in claim 18, wherein the first internal dimension (D1) increases from a minimum value adjacent to the second passage to a maximum value adjacent to the first passage and wherein the increase in the second internal dimension (D2) is greater than the increase in the first internal dimension (D1) over at least part of the intersection.

20. The housing as claimed in claim 1, wherein the second internal dimension (D2) is substantially constant over a substantial portion of the intersection between the second passage and the first passage.

21. The housing as claimed in claim 1, wherein the second internal dimension (D2) decreases from a maximum value adjacent to the second passage over at least a portion of the intersection.

22. A housing for use in high-pressure fluid applications, the housing being provided with a first passage defining a first axis (P1) and a second passage defining a second axis (P2), wherein a third axis (P3) is mutually orthogonal to the first axis (P1) and the second axis (P2), and wherein the passages intersect at an opening defined by an intersection at one end of the second passage, the intersection being shaped so that, when sectioned on a plane normal to the second axis (P2) and not intersecting the first passage, at least two portions of the intersection each describe elliptical arcs defining two coplanar non-coincident ellipses, wherein each ellipse has a minor axis parallel to the first axis (P1) and a major axis parallel to the third axis (P3).

23. The housing as claimed in claim 22, wherein the ratio of the major axis of the ellipse to the minor axis of the ellipse is at least 1.1 to 1.

24. The housing as claimed in claim 22, wherein the ratio of the major axis of the ellipse to the minor axis of the ellipse has a non-constant value when the intersection is sectioned on parallel planes normal to the second axis (P2) and not intersecting the first passage.

25. The housing as claimed in claim 22, wherein the second passage is substantially cylindrical about the second axis (P2), and the centre of each ellipse is offset from the second axis (P2) in a direction parallel to the first axis (P1).

* * * * *